United States Patent
Park et al.

(10) Patent No.: US 10,364,344 B2
(45) Date of Patent: Jul. 30, 2019

(54) THERMOPLASTIC RESIN COMPOSITION EXHIBITING SUPERIOR MATTE AND GLOSS, AND MOLDED ARTICLE MANUFACTURED FROM THE SAME

(71) Applicant: LG CHEM, LTD., Seoul (KR)

(72) Inventors: Chun Ho Park, Daejeon (KR); Yong Yeon Hwang, Daejeon (KR); Hyun Taek Oh, Daejeon (KR); Min Jung Kim, Daejeon (KR); Sang Mi Lee, Daejeon (KR); Yeong Min Lee, Daejeon (KR); Eun Soo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 93 days.

(21) Appl. No.: 15/533,357

(22) PCT Filed: Nov. 4, 2016

(86) PCT No.: PCT/KR2016/012704
§ 371 (c)(1),
(2) Date: Jun. 5, 2017

(87) PCT Pub. No.: WO2017/095031
PCT Pub. Date: Jun. 8, 2017

(65) Prior Publication Data
US 2017/0369692 A1    Dec. 28, 2017

(30) Foreign Application Priority Data
Dec. 4, 2015   (KR) .................... 10-2015-0172709

(51) Int. Cl.
| | | |
|---|---|---|
| *C08L 25/12* | (2006.01) | |
| *C08J 5/00* | (2006.01) | |
| *C08L 51/06* | (2006.01) | |
| *C08L 51/04* | (2006.01) | |

(52) U.S. Cl.
CPC .................. *C08L 25/12* (2013.01); *C08J 5/00* (2013.01); *C08L 51/04* (2013.01); *C08L 51/06* (2013.01); *C08L 2201/02* (2013.01); *C08L 2201/04* (2013.01); *C08L 2205/025* (2013.01); *C08L 2205/03* (2013.01)

(58) Field of Classification Search
CPC .... C08L 2205/025; C08L 51/04; C08L 25/12; C08L 51/06
See application file for complete search history.

(56) References Cited

U.S. PATENT DOCUMENTS

| | | | |
|---|---|---|---|
| 5,196,480 A | 3/1993 | Seitz et al. | |
| 6,100,001 A * | 8/2000 | Someda | C08F 279/02 430/111.1 |
| 2007/0027256 A1* | 2/2007 | Kim | C08L 51/04 525/70 |
| 2007/0078221 A1* | 4/2007 | Choi | C08F 279/02 525/70 |
| 2013/0345362 A1 | 12/2013 | Maeda et al. | |
| 2015/0011709 A1 | 1/2015 | Ahn et al. | |

FOREIGN PATENT DOCUMENTS

| | | |
|---|---|---|
| CN | 1188118 A | 7/1998 |
| CN | 1608107 A | 4/2005 |
| CN | 1764677 A | 4/2006 |
| CN | 103443154 A | 12/2013 |
| CN | 103764700 A | 4/2014 |
| EP | 2818514 A1 | 12/2014 |
| EP | 3216830 A1 | 9/2017 |
| KR | 10-2009-0016955 A | 2/2009 |
| KR | 10-0987957 B1 | 10/2010 |
| KR | 10-2013-0075812 A | 7/2013 |
| KR | 10-2015-0114239 A | 10/2015 |
| WO | 9710301 A1 | 3/1997 |
| WO | WO 2014/035055 A1 | 3/2014 |

OTHER PUBLICATIONS

International Search Report for International Patent Application No. PCT/KR2016/012704 filed on Nov. 4, 2016.
Extended European Search Report for EP Application No. 16870927.7, dated Aug. 30, 2018.
Chiense Office Action issued in Applciation No. 201811280221867O, dated Dec. 3, 2018.

* cited by examiner

*Primary Examiner* — Mark S Kaucher

(57) ABSTRACT

The present disclosure relates to a thermoplastic resin composition and a molded article manufactured from the same. More particularly, the present disclosure relates to a thermoplastic resin composition including 10 to 59% by weight of an acrylic graft copolymer resin (a) having a graft efficiency of 50 to 95%; 1 to 20% by weight of an acrylic graft copolymer resin (b) having a graft efficiency of 5 to 49%; and 21 to 89% by weight of an aromatic vinyl compound-vinyl cyan compound copolymer resin (c), wherein a weight ratio of (a):(b) is 1:1 to 10:1, and a molded article manufactured from the same. In accordance with the present disclosure, a thermoplastic resin composition that exhibits glossy effect by injection molding and matte effect by extrusion molding while providing superior mechanical strength and thus is applicable to both glossy products and matte products, and a molded article manufactured from the same are provided.

16 Claims, No Drawings

THERMOPLASTIC RESIN COMPOSITION EXHIBITING SUPERIOR MATTE AND GLOSS, AND MOLDED ARTICLE MANUFACTURED FROM THE SAME

CROSS-REFERENCE TO RELATED APPLICATION(S)

This application is a U.S. National Stage of International Patent Application No. PCT/KR2016/012704, filed on Nov. 4, 2016, which claims the priority benefit of Korean Patent Application No. 10-2015-0172709, filed on Dec. 4, 2015 in the Korean Intellectual Property Office, the disclosures of which are incorporated herein by reference.

TECHNICAL FIELD

The present disclosure relates to a thermoplastic resin composition and a molded article manufactured from the same. More particularly, the present disclosure relates to a thermoplastic resin composition that exhibits glossy effect by injection molding and matte effect by extrusion molding while providing superior mechanical strength and thus is applicable to both glossy products and matte products, and a molded article manufactured from the same.

BACKGROUND ART

An acrylate-styrene-acrylonitrile (ASA)-based resin is made of multilayered copolymer graft particles, i.e., particles having a core-shell structure. A core is mainly made of an acrylic rubber to increase impact strength, and a shell is mainly made of an aromatic vinyl compound, a vinyl cyan compound, an alkyl(meth)acrylate, or the like to increase colorability and dispersibility of a matrix resin.

Since an ASA-based resin has superior weatherability and aging resistance, it is used in various fields such as automobiles, ships, leisure goods, building materials, and gardening products, and usage thereof is rapidly increasing. Most products manufactured from ASA-based resin are glossy. Meanwhile, user demand for emotional quality has recently increased and thus demand for non-glossy resins allowing creation of more elegant atmosphere is increasing. Injection-molded products are preferred to be glossy, and extruded sheets are preferred to be matte. In accordance with such a trend, a method of producing matte and glossy products on one line may be considered. However, this method is complex, whereby production efficiency is decreased and the mechanical properties of a resin are deteriorated.

RELATED ART DOCUMENT

[Patent Document] KR 0987957 B1

DISCLOSURE

Technical Problem

Therefore, the present invention has been made in view of the above problems, and it is one object of the present invention to provide a thermoplastic resin composition that exhibits glossy effect by injection molding and matte effect by extrusion molding while providing superior mechanical strength and thus is applicable to both glossy products and matte products, and a molded article manufactured from the same.

The above and other objects can be accomplished by the present disclosure described below.

Technical Solution

In accordance with one aspect of the present invention, provided is a thermoplastic resin composition, including: 10 to 59% by weight of an acrylic graft copolymer resin (a) having a graft efficiency of 50 to 95%; 1 to 20% by weight of an acrylic graft copolymer resin (b) having a graft efficiency of 5 to 49%; and 21 to 89% by weight of an aromatic vinyl compound-vinyl cyan compound copolymer resin (c), wherein a weight ratio of (a):(b) is 1:1 to 10:1.

In accordance with another aspect of the present invention, provided is a molded article manufactured from the thermoplastic resin composition.

Advantageous Effects

As apparent from the fore-going, the present invention has been made to improve a problem that a process becomes complex and production efficiency is decreased when different composition types are produced on one line to address the problem that gloss is different according to a molding method. In accordance with the present disclosure, a thermoplastic resin composition that exhibits superior glossy effect by injection molding and superior matte effect by extrusion with superior mechanical properties even though the thermoplastic resin composition is only used, and a molded article manufactured from the same are provided.

BEST MODE

Hereinafter, the present invention is described in detail.

A thermoplastic resin composition of the present disclosure includes 10 to 59% by weight of an acrylic graft copolymer resin (a) having a graft efficiency of 50 to 95%; 1 to 20% by weight of an acrylic graft copolymer resin (b) having a graft efficiency of 5 to 49%; and 21 to 89% by weight of an aromatic vinyl compound-vinyl cyan compound copolymer resin (c), wherein a weight ratio of (a):(b) is 1:1 to 10:1. Within this range, a thermoplastic resin composition exhibiting glossy effect by injection molding and matte effect by extrusion molding while providing superior mechanical strength and thus being applicable to both glossy products and matte products may be provided.

In another embodiment, the thermoplastic resin composition of the present disclosure includes 25 to 40% by weight of an acrylic graft copolymer resin (a) having a graft efficiency of 50 to 95%; 3 to 15% by weight of an acrylic graft copolymer resin (b) having a graft efficiency of 5 to 49%; and 50 to 70% by weight of an aromatic vinyl compound-vinyl cyan compound copolymer resin (c), wherein a weight ratio of (a):(b) is 1:1 to 7:1. Within this range, a thermoplastic resin composition exhibiting glossy effect by injection molding and matte effect by extrusion molding while providing superior mechanical strength and thus being applicable to both glossy products and matte products may be provided.

In another embodiment, the thermoplastic resin composition of the present disclosure includes 20 to 35% by weight of an acrylic graft copolymer resin (a) having a graft efficiency of 50 to 95%; 3 to 15% by weight of an acrylic graft copolymer resin (b) having a graft efficiency of 5 to 49%; and 50 to 77% by weight of an aromatic vinyl compound-vinyl cyan compound copolymer resin (c), wherein a weight ratio of (a):(b) is 1:1 to 7:1. Within this range, a thermoplastic resin composition exhibiting glossy effect by injection molding and matte effect by extrusion molding while providing superior mechanical strength and thus being applicable to both glossy products and matte products may be provided.

The acrylic graft copolymer resin (a) may have a graft efficiency of, for example, 65 to 85%, or 70 to 80%. Within this range, superior impact strength and property balance are exhibited.

Each of the graft copolymer resins (a) and (b) may have an average particle diameter of, for example, 0.05 to 1 μm, or 0.2 to 0.7 μm. Within this range, superior mechanical properties are provided.

The acrylic graft copolymer resin (a) may be prepared by polymerizing, for example, 10 to 60% by weight of an acrylic rubber, 30 to 60% by weight of an aromatic vinyl compound, and 10 to 30% by weight of a vinyl cyan compound; or 25 to 45% by weight of an acrylic rubber, 40 to 50% by weight of an aromatic vinyl compound, and 15 to 25% by weight of a vinyl cyan compound.

The acrylic graft copolymer resin (a) may have a weight average molecular weight of, for example, 50,000 to 150,000 g/mol, 80,000 to 145,000 g/mol, or 100,000 to 140,000 g/mol. Within this range, superior impact strength and property balance are exhibited.

When the acrylic graft copolymer resin (a) is polymerized, for example, an emulsifier, a molecular weight regulator, and a polymerization initiator may be included. A graft copolymer powder may be obtained by adding an antioxidant and a stabilizer to graft copolymer latex obtained after polymerization and performing agglomeration, followed by dehydration and drying.

The acrylic graft copolymer resin (b) may have a graft efficiency of, for example, 10 to 30%, or 10 to 20%. Within this range, superior matte effect is provided.

The acrylic graft copolymer resin (b) may be prepared by polymerizing, for example, 60 to 95% by weight of an acrylic rubber, 1 to 30% by weight of an aromatic vinyl compound, and 1 to 20% by weight of a vinyl cyan compound; or 71 to 90% by weight of an acrylic rubber, 8 to 20% by weight of an aromatic vinyl compound, and 2 to 9% by weight of a vinyl cyan compound. Within this range, superior property balance is provided.

The acrylic graft copolymer resin (b) may have a weight average molecular weight of, for example, 50,000 to 300,000 g/mol, 70,000 to 250,000 g/ml, or 80,000 to 230,000 g/mol. Within this range, superior processability is provided.

When the acrylic graft copolymer resin (b) is polymerized, for example, an emulsifier and a polymerization initiator are included, but a grafting agent is excluded. A graft copolymer powder may be obtained by adding an antioxidant and a stabilizer to the graft copolymer latex, which has been obtained after polymerization, and then performing agglomeration, followed by dehydration and drying.

A weight ratio of the acrylic graft copolymer resin (a):the acrylic graft copolymer resin (b) may be, for example, 2:1 to 6:1. Within this range, superior glossy effect is provided by injection molding, and superior matte effect is provided by extrusion molding.

The aromatic vinyl compound-vinyl cyan compound copolymer resin (c) may be prepared by polymerizing, for example, 60 to 80% by weight of an aromatic vinyl compound and 20 to 40% by weight of a vinyl cyan compound; or 65 to 75% by weight of an aromatic vinyl compound and 25 to 35% by weight of a vinyl cyan compound.

The acrylic rubber may be, for example, an alkyl (meth) acrylate polymer having a carbon number of 1 to 15. In a particular example, the acrylic rubber may be prepared by polymerizing one or more selected from the group consisting of ethyl acrylate, ethyl methacrylate, methyl acrylate, methyl methacrylate, butyl acrylate, butyl methacrylate, propyl acrylate, propyl methacrylate, and 2-ethylhexyl acrylate.

The aromatic vinyl compound may be, for example, one or more selected from the group consisting of styrene, α-methyl styrene, p-methyl styrene, 2,4-dimethyl styrene, and vinyl toluene.

The vinyl cyan compound may be, for example, one or more selected from the group consisting of acrylonitrile, methacrylonitrile, and ethacrylonitrile.

The thermoplastic composition may be further include, for example, one or more selected from the group consisting of a flame retardant, an antioxidant, an antistatic agent, an anti-dripping agent, a releasing agent, an antimicrobial agent, a heat stabilizer, a lubricant, a UV stabilizer, an impact modifier, a filler, an inorganic additive, a stabilizer, a pigment, and a dye.

The thermoplastic resin composition, for example, may exclude a diene-based graft copolymer. In this case, superior glossy effect is provided by injection molding, and superior matte effect is provided by extrusion molding.

The thermoplastic resin composition may have, for example, a gloss after injection-molding of 60 to 100 and a gloss after extrusion-molding of 20 to 45, or a gloss after injection-molding of 70 to 90 and a gloss after extrusion-molding of 30 to 40, measured according to ASTM D23.

The thermoplastic resin composition may be, for example, a thermoplastic resin composition applicable to both matte products and glossy products, i.e., a thermoplastic resin composition for a glossy or matte product.

A method of preparing the thermoplastic resin composition of the present disclosure includes a step of melt-kneading and then extruding 10 to 59% by weight of an acrylic graft copolymer resin (a) having a graft efficiency of 50 to 95%; 1 to 20% by weight of an acrylic graft copolymer resin (b) having a graft efficiency of 5 to 49%; and 21 to 89% by weight of an aromatic vinyl compound-vinyl cyan compound copolymer resin (c), wherein a weight ratio of (a):(b) is 1:1 to 10:1.

The melt-kneading may be carried out, for example, at 200 to 290° C., or 200 to 260° C.

The present disclosure provides a molded article manufactured from the thermoplastic resin composition.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Compounds used in examples and comparative examples below are as follows.
  ASA-1: Having a graft efficiency of 73.1% and a weight average molecular weight of 139,000 g/mol and prepared by polymerizing 40% by weight of butyl acrylate, 40% by weight of styrene, and 20% by weight of acrylonitrile.
  ASA-2: Having a graft efficiency of 16.0% and a weight average molecular weight of 209,000 g/mol and prepared by polymerizing 85% by weight of butyl acrylate, 12% by weight of styrene, and 3% by weight of acrylonitrile.

ASA-3: Having a graft efficiency of 15.6% and a weight average molecular weight of 81,000 g/mol and prepared by polymerizing 75% by weight of butyl acrylate, 20% by weight of styrene, and 5% by weight of acrylonitrile.

SAN resin: Prepared by polymerizing 70% by weight of styrene and 30% by weight of acrylonitrile.

Large-diameter ABS resin: Prepared by polymerizing 15% by weight of butadiene having an average particle diameter of 10 µm, 70% by weight of styrene, and 15% by weight of acrylonitrile.

Examples 1 to 4 and Comparative Examples 1 to 5

Each ingredient was added in an amount as summarized in Table 1 below, followed by mixing. Extrusion was performed by means of a twin-screw extruder at 240° C. and then a pellet was produced, followed by drying.

<Manufacture of Injection Specimen>

The dried pellet was injection-molded at 200 to 240° C. by means of an injection molding machine. As a result, a thermoplastic resin composition injection specimen was prepared.

<Manufacture of Extrusion Specimen>

The dried pellet was extruded at 200 to 240° C. by means of an extruder. As a result, a thermoplastic resin composition extrusion specimen was prepared.

Test Example

The characteristics of a thermoplastic resin manufactured according to each of Examples 1 to 4 and Comparative Examples 1 to 5 were measured according to the following methods. Results are summarized in Table 1 below.

Average particle diameter (µm): Measured using the intensity Gaussian distribution (Nicomp 380) according to a dynamic laser light scattering method.

Graft efficiency (%): A polymer was separated into particles and then dried. Subsequently, the dried polymer was swollen in acetone at room temperature, and then centrifuged at 12000 rpm for 120 minutes at 0° C. A separated acetone-insoluble gel and acetone-soluble sol were collected, and then dried in a hot air drier to obtain a value according to Mathematical Equation 1 below:

Graft efficiency (%)=(Total weight of grafted monomer/total weight of shell monomer)×100     [Mathematical Equation 1]

Impact strength (¼", kgf·cm/cm): Measured according to ASTM D256.

Tensile Strength (kgf/cm$^2$): Measured according to ASTM D638.

Flexural strength (kg/cm$^2$): Measured according to ASTM D790.

Gloss (45°): Gloss of each of an injection-molded specimen and an extruded specimen was measured at 45° according to ASTM D528.

TABLE 1

| Classification | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| ASA-1 | 30 | 30 | 25 | 40 | 35 | 30 | — | — | 15 |
| ASA-2 | 5 | — | — | 7 | — | — | 35 | — | 20 |
| ASA-3 | — | 5 | 10 | — | — | — | — | 35 | — |
| Large-diameter ABS | — | — | — | — | — | 5 | — | — | — |
| SAN | 65 | 65 | 65 | 53 | 65 | 65 | 65 | 65 | 65 |
| Impact strength | 5.3 | 5.3 | 5.5 | 6.4 | 4.6 | 7.2 | 3.1 | 2.8 | 3.9 |
| Tensile strength | 499 | 517 | 507 | 482 | 518 | 526 | 522 | 524 | 509 |
| Flexaural strength | 816 | 850 | 858 | 798 | 825 | 878 | 868 | 872 | 830 |
| Gloss after injection-molding | 72 | 82 | 80 | 71 | 61 | 28 | 30 | 32 | 45 |
| Gloss after extrusion-molding | 38 | 38 | 35 | 37 | 58 | 46 | 34 | 35 | 36 |

As shown in Table 1, it can be confirmed that, in the cases of Examples 1 to 4 according to the method of the present disclosure, mechanical properties, such as impact strength, tensile Strength, and flexural strength, are superior, and both gloss after injection-molding and gloss after extrusion-molding are superior.

On the other hand, it can be confirmed that, in the case of Comparative Example 1 in which ASA-2 and ASA-3 with low graft efficiency are not included, gloss after extrusion-molding is not decreased, but impact strength is decreased. In addition, it can be confirmed that, in the case of Comparative Example 2 in which a large-diameter ABS resin, instead of an ASA resin with low graft efficiency, is included, gloss after extrusion-molding increases and thus low loss is decreased, but gloss after injection-molding is rapidly decreased and thus high gloss is decreased.

Further, it can be confirmed that, in the cases of Comparative Examples 3 and 4 in which ASA-1 is not included, all of impact strength, gloss after injection-molding, and gloss after extrusion-molding are decreased. In addition, it can be confirmed that, in the case of Comparative Example 5 in which a weight ratio of ASA-1 to ASA-2 is 1:1.33, all of impact strength, gloss after injection-molding, and gloss after extrusion-molding are decreased.

What is claimed is:

1. A thermoplastic resin composition, comprising:
    10 to 59% by weight of an acrylic graft copolymer resin (a) having a graft efficiency of 50 to 95%, the resin (a) comprising 10 to 60% by weight of an acrylic rubber, 30 to 60% by weight of an aromatic vinyl compound, and 10 to 30% by weight of a vinyl cyan compound;
    1 to 20% by weight of an acrylic graft copolymer resin (b) having a graft efficiency of 10-20%, the resin (b) comprising 60 to 95% by weight of an acrylic rubber, 1 to 30% by weight of an aromatic vinyl compound, and 1 to 20% by weight of a vinyl cyan compound; and
    21 to 89% by weight of an aromatic vinyl compound-vinyl cyan compound copolymer resin (c),
    wherein a weight ratio of (a):(b) is 1:1 to 10:1.

2. The thermoplastic resin composition according to claim 1, wherein each of the graft copolymer resins (a) and (b) has an average particle diameter of 0.05 to 1 μm.

3. The thermoplastic resin composition according to claim 1, wherein the acrylic graft copolymer resin (a) has a weight average molecular weight of 50,000 to 150,000 g/mol.

4. The thermoplastic resin composition according to claim 1, wherein the acrylic graft copolymer resin (b) has a weight average molecular weight of 50,000 to 300,000 g/mol.

5. The thermoplastic resin composition according to claim 1, wherein the aromatic vinyl compound-vinyl cyan compound copolymer resin (c) is prepared by polymerizing 60 to 80% by weight of an aromatic vinyl compound and 20 to 40% by weight of a vinyl cyan compound.

6. The thermoplastic resin composition according to claim 1, wherein the acrylic rubber is an alkyl (meth)acrylate polymer having a carbon number of 1 to 15.

7. The thermoplastic resin composition according to claim 1, wherein the aromatic vinyl compound is one or more selected from the group consisting of styrene, α-methyl styrene, p-methyl styrene, 2,4-dimethyl styrene, and vinyl toluene.

8. The thermoplastic resin composition according to claim 1, wherein the vinyl cyan compound is one or more selected from the group consisting of acrylonitrile, methacrylonitrile, and ethacrylonitrile.

9. The thermoplastic resin composition according to claim 6, wherein the acrylic rubber is prepared by polymerizing one or more selected from the group consisting of ethylacrylate, ethyl methacrylate, methyl acrylate, methyl methacrylate, butyl acrylate, butyl methacrylate, propyl acrylate, propyl methacrylate, and 2-ethylhexyl acrylate.

10. The thermoplastic resin composition according to claim 1, wherein the thermoplastic composition further comprises one or more selected from the group consisting of a flame retardant, an antimicrobial agent, an antistatic agent, an anti-dripping agent, a releasing agent, an antioxidant, a heat stabilizer, a lubricant, a UV stabilizer, an impact modifier, a filler, an inorganic additive, a stabilizer, a pigment, and a dye.

11. The thermoplastic resin composition according to claim 1, wherein the thermoplastic resin composition has a gloss after injection-molding of 60 to 100 and a gloss after extrusion-molding of 20 to 45, measured according to ASTM D523 at 45 degrees.

12. The thermoplastic resin composition according to claim 1, wherein the thermoplastic resin composition does not comprise a diene-based graft copolymer.

13. The thermoplastic resin composition according to claim 1, wherein the thermoplastic resin composition is applicable to both a matte product and a glossy product.

14. A method of preparing a thermoplastic resin composition, the method comprising a step of melt-kneading and then extruding 10 to 59% by weight of an acrylic graft copolymer resin (a) having a graft efficiency of 50 to 95%, the resin (a) comprising 10 to 60% by weight of an acrylic rubber, 30 to 60% by weight of an aromatic vinyl compound, and 10 to 30% by weight of a vinyl cyan compound;

1 to 20% by weight of an acrylic graft copolymer resin (b) having a graft efficiency of 10-20%, the resin (b) comprising 60 to 95% by weight of an acrylic rubber, 1 to 30% by weight of an aromatic vinyl compound, and 1 to 20% by weight of a vinyl cyan compound; and 21 to 89% by weight of an aromatic vinyl compound-vinyl cyan compound copolymer resin (c), wherein a weight ratio of (a):(b) is 1:1 to 10:1.

15. A molded article manufactured from the thermoplastic resin composition according to claim 1.

16. The thermoplastic resin of claim 1, wherein the acrylic graft copolymer resin (a) has a graft efficiency of 65 to 85%.

* * * * *